US008793796B2

(12) United States Patent
Panasyuk

(10) Patent No.: US 8,793,796 B2
(45) Date of Patent: Jul. 29, 2014

(54) BOOTING A DEVICE FROM A TRUSTED ENVIRONMENT RESPONSIVE TO DEVICE HIBERNATION

(75) Inventor: Anatoliy Panasyuk, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1344 days.

(21) Appl. No.: 11/971,844

(22) Filed: Jan. 9, 2008

(65) Prior Publication Data
US 2009/0178141 A1    Jul. 9, 2009

(51) Int. Cl.
G06F 21/00    (2013.01)
G06F 21/56    (2013.01)
G06F 21/57    (2013.01)

(52) U.S. Cl.
CPC .............. G06F 21/56 (2013.01); G06F 21/566 (2013.01); G06F 21/575 (2013.01)
USPC ................. 726/24; 713/2; 713/188; 713/323; 380/277

(58) Field of Classification Search
CPC ...... G06F 21/56; G06F 21/566; G06F 21/575
USPC .................. 713/2, 188, 323; 380/277; 726/24
See application file for complete search history.

(56) References Cited

U.S. PATENT DOCUMENTS

| | | | |
|---|---|---|---|
| 5,850,559 A * | 12/1998 | Angelo et al. ................. 713/320 |
| 6,292,890 B1 | 9/2001 | Crisan | |
| 6,385,721 B1 * | 5/2002 | Puckette ........................... 713/2 |
| 6,393,584 B1 * | 5/2002 | McLaren et al. ................. 714/14 |
| 7,024,581 B1 | 4/2006 | Wang et al. | |
| 7,184,554 B2 * | 2/2007 | Freese ............................. 380/270 |
| 7,840,795 B2 * | 11/2010 | Peterson et al. .................... 713/2 |
| 2004/0158741 A1 * | 8/2004 | Schneider ....................... 713/201 |
| 2005/0027972 A1 * | 2/2005 | Harrington et al. ............ 712/233 |
| 2006/0031673 A1 | 2/2006 | Beck et al. | |
| 2006/0095583 A1 * | 5/2006 | Owhadi et al. ................. 709/238 |
| 2006/0190938 A1 | 8/2006 | Capek et al. | |
| 2007/0078915 A1 | 4/2007 | Gassoway | |
| 2007/0079178 A1 | 4/2007 | Gassoway | |
| 2007/0136807 A1 * | 6/2007 | DeLiberato et al. ............. 726/22 |
| 2007/0174910 A1 | 7/2007 | Zachman et al. | |
| 2007/0174915 A1 | 7/2007 | Gribble et al. | |

OTHER PUBLICATIONS

Marx—"Rescue ME 2: Disinfection with Bootable Rescue media", Mar. 2004.*

(Continued)

Primary Examiner — Saleh Najjar
Assistant Examiner — Joseph Pan
(74) Attorney, Agent, or Firm — Jim Sfekas; Kate Drakos; Micky Minhas

(57) ABSTRACT

Techniques described are capable of receiving an indication that an operating system of a computing device has entered a hibernated state and, in response, booting the computing device from a trusted environment that is unalterable by the hibernated operating system. A component stored on or accessible by the trusted environment may then perform an operation on the computing device. This operation may include scanning the device, performing a memory test on the device, or updating firmware on the device. In some instances, the computing device enters the hibernated state due to a predetermined length of user inactivity on the computing device. As such, the described techniques may perform an operation on the computing device without user interaction causing the operation.

20 Claims, 6 Drawing Sheets

(56) References Cited

OTHER PUBLICATIONS

"Preventing Spyware Infestation", at <<http://www.winproxy.com/mktg/whitepapers/winproxy-Spyware-wp-v3.pdf>>, Blue Coat Systems, Inc., 2005, pp. 12.

"Vista's BitLocker Drive Encryption", at <<http://www.windowsitpro.com/Windows/Article/ArticleID/95673/95673.html>>, Penton Media, Inc., 2007, pp. 2.

* cited by examiner

BOOTING A DEVICE FROM A TRUSTED ENVIRONMENT RESPONSIVE TO DEVICE HIBERNATION

BACKGROUND

Traditional antivirus software performs periodic or real-time scans of a computing device by running the software from within an operating system for which protection is sought. This type of software works well for known viruses, as the antivirus software is able to use known virus signatures to detect infected files as they enter the computing device. These files may enter the computing device via user downloads, network access, or new files that have been copied from an external drive of the computing device. Traditional antivirus software detects these known viruses by scanning the computing device on a periodic basis.

While this approach works well for known viruses, this approach is less effective in instances where the virus signatures of the software are not up-to-date. This approach is also less effective for new viruses for which no signatures have yet to be created (so-called "zero-day exploits"). This limitation becomes even more apparent when viruses on the computing device employ "rootkit" techniques.

In short, these rootkit-enabled viruses function to hide themselves from the antivirus software running on the computing device. If a rootkit-enabled virus infects the computing device (e.g., via a zero-day exploit or when the software's signatures are out of date), the antivirus software has very little chance of detecting the presence of the virus and, hence, of removing the virus from the computing device.

To combat the limitations, some antivirus software attempts to detect rootkit-enabled viruses by detecting discrepancies in the operating system of the computing device. Because this approach is predicated on weaknesses in the masquerading techniques of the rootkit, rootkit developers can continue creating better and better rootkits to avoid detection. In other words, this approach leads to a potentially never-ending arms race.

Another approach to rootkit detection includes booting the computer from a known "clean" operating system image. While this solution is effective, this solution requires significant user interaction. That is, a user of the computing device must proactively choose to scan the computing device. This proactive scan often requires the user to close down all open applications and reboot the computing device. Due to these impositions, users often do not scan the computing device from the clean operating system and, hence, the computing device remains subject to attack by rootkit-enabled viruses.

SUMMARY

This document describes techniques capable of receiving an indication that an operating system of a computing device has entered a hibernated state and, in response, booting the computing device from a trusted environment that is unalterable by the hibernated operating system. A component stored on or accessible by the trusted environment may then perform an operation on the computing device. This operation may include scanning the device, performing a memory test on the device, or updating firmware on the device. In some instances, the computing device enters the hibernated state due to a predetermined length of user inactivity on the computing device. As such, the described techniques may perform an operation on the computing device without user interaction causing the operation.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions as permitted by the context above and throughout the document.

BRIEF DESCRIPTION OF THE CONTENTS

The detailed description is described with reference to accompanying figures. In the figures, the left-most digit(s) of a reference number identifies, where feasible, the figure in which the reference number first appears. The use of the same reference numbers in different figures indicates similar or identical items.

DETAILED DESCRIPTION

Figure 1:
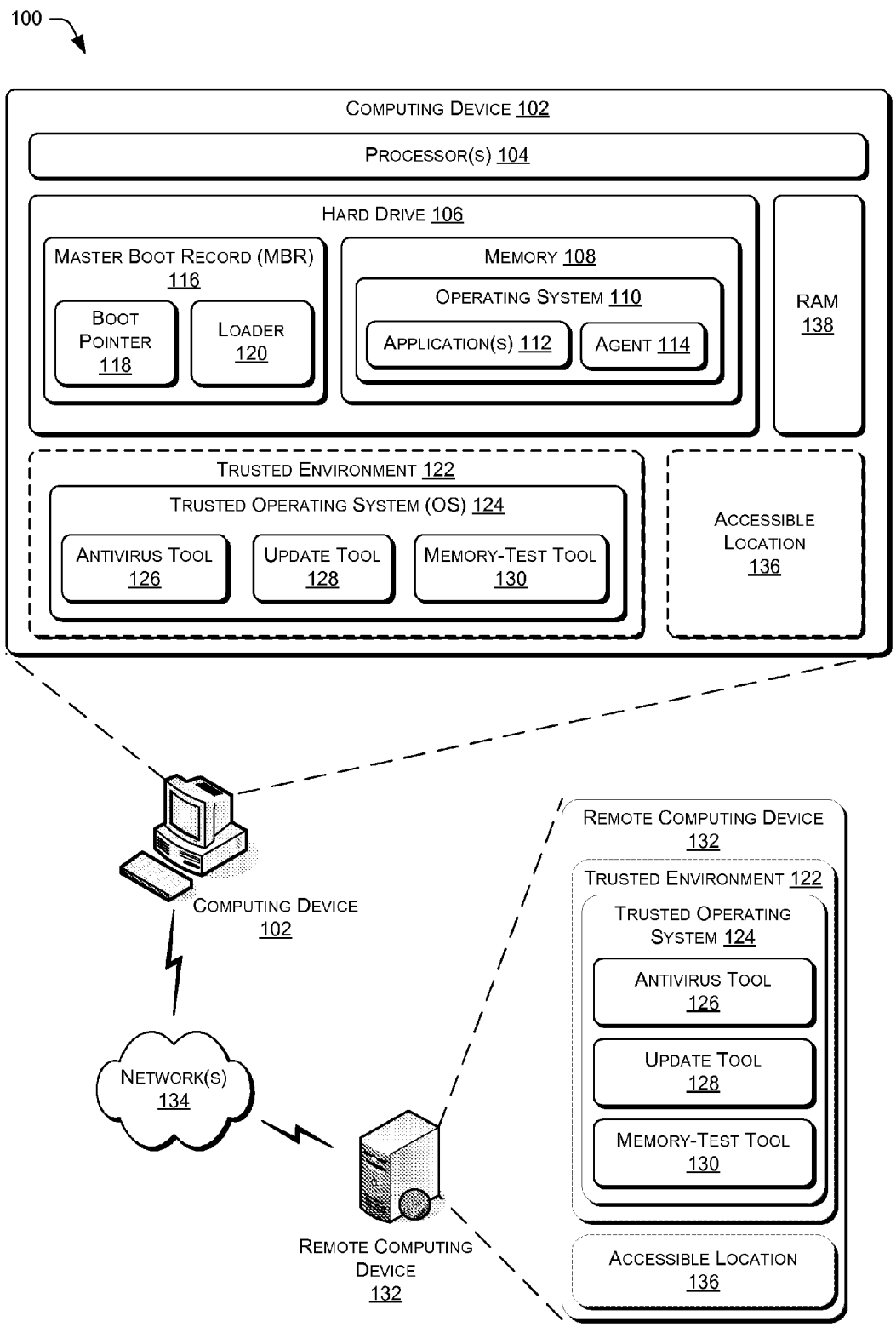
FIG. 1 depicts an illustrative architecture in which an operation may be performed on a computing device in response to hibernation of the computing device. The operation may be performed by a trusted environment, which may be resident on the computing device or on a network device.

The following discussion targets techniques for performing an operation, such as an antivirus scan, on a computing device in response to a primary operating system of the computing device entering a low-power state (e.g., a hibernated state). To perform the operation, an agent that is integral with or accessible by the computing device boots the computing device from a trusted environment. In some instances, the trusted environment is unalterable from the hibernated operating system. A component integral with or accessible by the trusted environment may then perform the operation on the computing device. In some instances, the computing device enters the hibernated state due to a predetermined length of user inactivity on the computing device. As such, the described techniques perform the operation on the computing device without user interaction causing the operation.

Additionally, because the primary operating system enters a low-power state such as a hibernated state, contents of the operating system are stored to non-volatile storage (e.g., a hard drive) of the computing device before the operation is performed. That is, when operating system enters the low-power state, contents of random access memory (RAM) and system state are stored to non-volatile storage (e.g., a hard drive). After the operation such as the antivirus scan is performed, these contents may be restored, either automatically or upon user selection instructing the computing device to "wake up" or power on. As such, the described techniques allow for performing the operation without disturbing a computing session of the user. That is, the operation is performed without requiring the user to close out open applications running on the operating system. Still further, the described techniques allow for performing the operation without the user requesting that the operation be performed. These techniques thus allow for performance of non-intrusive operations, which may result in the performance of more operations such as antivirus scans on the computing device.

To highlight, imagine that a user operating a computing device leaves the computing device running at night after the user goes to sleep. Imagine also that this user leaves open one or more applications on the device, such as a word processing application, a drawing application, a web browser application, and so forth. After a certain length of user inactivity, meanwhile, the computing device may begin to hibernate. That is, the computing device may store contents of the computer RAM to non-volatile storage of or accessible by the computing device. Additionally, the computing device may power down (e.g., power off) some or all components of the device.

Responsive to this hibernation, or before allowing that the hibernation process to complete, the computing device may reboot from a trusted environment in order to perform an operation on the computing device. After performance of the operation, the contents of the hibernated operating system may be restored. To restore these contents, the computing device may reboot from a location of the operating system (e.g., from a hard drive on which the operating system runs).

Additionally or alternatively, a boot pointer of the computing device may be altered to point to the location of the operating system. Here, the computing device may remain powered down until the user desires to "wake up" the computing device from the hibernated state. When the user so desires, the computing device will boot from the location of the operating system and the contents of the operating system will be restored. For instance, the applications that the user previously left open will display on a monitor of the computing device in a same state as when the user went to sleep. Therefore, the rebooting of the computing device and the performance of the operation from the trusted environment may be unperceivable to the user.

The discussion begins with a section entitled "Illustrative Architecture", which describes an architecture that may employ the claimed techniques. This section also describes several illustrative and non-limiting implementations of devices that may employ the claimed techniques. A second section, entitled "Illustrative Processes", follows and describes how the claimed techniques may reboot a computing device from a trusted environment in response to the computing device entering a low-power state, such as a hibernated state.

This brief introduction, including section titles and corresponding summaries, is provided for the convenience of the reader and is not intended to limit the scope of the claims, nor the proceeding sections.

Illustrative Architecture

FIG. 1 illustrates an illustrative architecture 100 that may employ the claimed techniques. While the claimed techniques are described with reference to architecture 100, it is specifically noted that multiple other architectures and environments may also employ these techniques. As illustrated, architecture 100 includes a computing device 102, here illustrated as a personal computer (PC). While FIG. 1 illustrates computing device 102 as a PC, this device may instead comprise, without limitation, a laptop computer, a terminal server, a mobile phone, a personal digital assistant (PDA), a portable media player (PMP) (e.g., a portable video player (PVP) or a digital audio player (DAP)), or any other sort of computing device.

As illustrated, computing device 102 includes one or more processors 104, Random Access Memory (RAM) 138 as well as a hard drive 106. While FIG. 1 illustrates hard drive 106, other implementations may employ other types of non-volatile storage, either singly or in combination. Hard drive 106 is shown to include memory 108, which stores an operating system 110. Memory 108 here comprises non-volatile and/or persistent memory. Computing device 102 may include additional memory, which may comprise volatile and nonvolatile, removable and non-removable media implemented in any method or technology for storage of information, such as computer-readable instructions, data structures, program modules or other data.

Operating system 110, meanwhile, includes one or more applications 112 and an agent 114. Applications 112 may include any typical applications stored on a computing device, such as a word processing application, a drawing application, a web browsing application, and so forth. Agent 114, meanwhile, functions to implement some or all of the claimed techniques, and is described in more detail below. It is to be appreciated that while FIG. 1 illustrates agent 114 as being stored in operating system 110, agent 114 may reside in any other area or combination of areas on or accessible by computing device 102.

Hard drive 106 also stores a master boot record (MBR) 116, which itself includes a boot pointer 118 and a loader 120. MBR 116 initiates the boot process of computing device 102. Boot pointer 118, meanwhile, points to a device or partition (i.e., logical partition) that loader 120 should load during the boot process. For instance, in instances where computing device 102 includes multiple hard drives, boot pointer 118 points to which one or more of the drives that should be loaded. Loader 120 then loads the appropriate drive or drives. Additionally or alternatively, boot pointer 118 may point to a particular partition on a drive, a network device, or any other environment or device.

FIG. 1 further illustrates that computing device 102 may include or otherwise have access to a trusted environment 122. In some instances, trusted environment 122 may be an environment that inaccessible and/or unalterable from the location of operating system 110. For instance, contents of trusted environment 122 may be read-only, such operating system 110 (or an actor operating there from) may not alter the contents of the trusted environment.

In some instances, agent 114 alters boot pointer 118 to point to trusted environment 122 in order to load a trusted operating system 124 onto computing device 102. Agent 114 may alter the boot pointer and may reboot computing device 102 from trusted environment 122 in response to a predetermined action. For instance, agent 114 may initiate a reboot sequence in response to computing device entering a low-power state such as "standby" mode, "hibernation" mode, or another low-power mode. Computing device 102 may enter this low-power mode in response to user commands, user inactivity, or otherwise. In one implementation, agent 114 reboots computing device 102 from trusted environment 122 in response to computing device 102 entering a hibernated state due to user inactivity of the device. The code running on agent 114 that is responsible for initiating this process may be baked into existing hibernation code on the computing device or may be located elsewhere.

In some implementations, trusted environment 122 stores or has access to a trusted operating system (OS) 124, which itself may store or have access to one or more tools or applications. Each of these tools or applications may be configured to perform a respective operation upon computing device 102. For instance, trusted OS 124 may include an antivirus tool 126, an update tool 128, and/or a memory-test tool 130. Trusted OS 124 may run antivirus tool 126 to scan computing device 102 for viruses or malware. Update tool 128, meanwhile, may function to update software, firmware, or other components of computing device 102. Finally, memory-test tool 130 may perform one or more different types of memory tests on computing device 102. For instance, tool 130 may check the device for defective memory or the like. While FIG. 1 illustrates a few illustrative examples, trusted OS 124 may include multiple other tools or applications for performing operations upon computing device 102.

Furthermore, after performance of an operation from trusted OS 124, the respective tool may store a result of the operation in a location 136 that is accessible from both the operating system 110 and trusted environment 122. That is, applications and tools from both operating system 110 and trusted environment 122 may read and/or store information in accessible location 136. Accessible location 136 may comprise any location in which data may be stored. For instance, accessible location 136 may comprise a file on a hard drive (local or remote) or another storage device, including BIOS, FLASH, SRAM/DRAM, or any other storage location or memory device.

In addition to storing a result, accessible location 136 may store virus signature updates, firmware updates, or any other files or data that needs to be communicated between operating system 110 and trusted environment 122. Using the example of a firmware update, operating system 110 may retrieve the new version of the firmware (stored by update tool 128) from accessible location 136 and operating system 110 may accordingly update the corresponding firmware.

After performance of the operation, such as the antivirus scan, memory test, or the like, agent 114 may thereafter alter boot pointer 118 to point to the location of operating system 110. Therefore, when a user of computing device 102 enters a command to wake up the computing device, the computing device will revert to the location of operating system 110, as the user would expect, restoring hibernated state of the operating system and applications. Additionally or alternatively, agent 114 may itself instruct MBR 116 to begin the reboot process after the performance of the operation.

To highlight the described components, in one non-limiting example computing device 102 enters a hibernated state due to user inactivity for a predetermined length of time. Note also that the computing device may also enter this hibernated state in response to a command of the user. Agent 114 thereafter alters boot pointer 118 to point to trusted environment 122. Agent 114 then reboots computing device 102 from trusted environment 122, which in turns loads trusted OS 124. Trusted OS 124 may then run antivirus tool 126 to perform a scan on the computing device. Because antivirus tool 126 runs from a trusted operating system, tool 126 may detect all or substantially all viruses operating on computing device 102, including rootkit-enabled viruses.

Tool 126 may then store a result of this scan in accessible location 136. For instance, if antivirus tool 126 does not detect any viruses on computing device 102, then tool 126 may store such an indication in accessible location 136. Agent 114 may then alter boot pointer 118 to point to the location of operating system 110. When the user thereafter wakes up computing device 102, operating system 110 may access accessible location 136 and may indicate to the user that an antivirus scan occurred and that no viruses were found.

If, however, tool 126 does indeed detect a virus on computing device 102, then tool 126 may store a corresponding indication in accessible location 136. In this instance, agent 114 may not alter boot pointer 118 until after tool 126 or some other entity has removed the detected virus. Tool 126 may therefore remove the virus and store a corresponding indication in accessible location 136. Agent 114 may thereafter alter boot pointer 118 to point to the location of operating system 110. When the user wakes up computing device 102, operating system 110 may notify the user that antivirus scan occurred and, in response, a virus was detected and removed. In other instances where tool 126 detected a virus, agent 114 may alter boot pointer 118 to point to operating system 110. When operating system 110 loads in response to a user command to awaken the device, however, the operating system indicates to the user that a virus was detected and should be removed. Responsive to user agreement, operating system 110 may remove the virus from computing device 102.

While FIG. 1 illustrates that trusted environment 122 may be integral with computing device 102, FIG. 1 also illustrates that trusted environment 122 may reside on a remote computing device 132. In these instances, computing device 102 may access remote computing device 132 via a network 134. Network 134 may comprise the Internet, a Local Area Network (LAN), a Wide Area Network (WAN), a wireless network, and/or the like. Remote computing device 132 may store (or may itself have access to) trusted environment 122, which may store or have access to similar or the same components described above. Additionally, remote computing device 132 may contain accessible location 136. While FIG. 1 generally illustrates potential locations of trusted environment 122, FIGS. 2-4 depict specific illustrative localities in which this trusted environment may reside.

Figure 2:
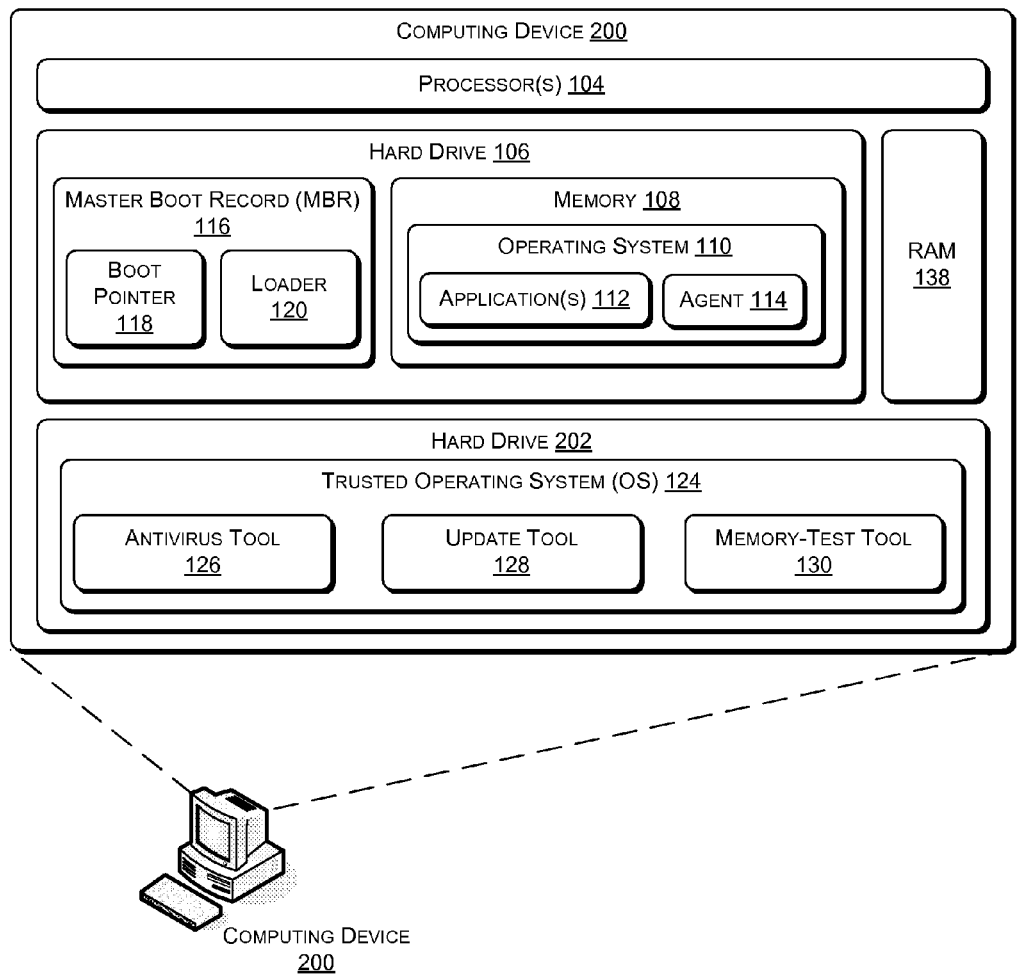
FIG. 2 depicts an illustrative computing device of FIG. 1 where the trusted environment comprises a separate hard drive on the computing device.

FIG. 2, for instance, illustrates a computing device 200 having many of the same components as computing device 102. For instance, computing device 200 is shown to include processors 104, hard drive 106, memory 108, and the like. FIG. 2 also illustrates that computing device includes two hard drives, namely hard drive 106 as well as a second hard drive 202. Here, hard drive 202 stores trusted OS 124, which itself may store or have access to tools, such as antivirus tool 126 and/or the like.

With reference to the configuration of computing device 200, agent 114 may alter boot pointer 118 to point to hard drive 202 after computing device 200 enters a hibernated state. Agent 114 may thereafter cause computing device to reboot to hard drive 202 in order to load trusted OS 124. An application or tool, such as antivirus tool 126, may thereafter run from trusted OS 124. After performance of the operation, such as the antivirus scan, agent 114 may alter boot pointer 118 to point back to hard drive 106. Again, the computing device may reboot or may merely be powered down back to its hibernated state until a user requests that the device awaken or power on. When such a command is received, loader 120 will load operating system 110, as boot pointer 118 now points to hard drive 106.

Figure 3:
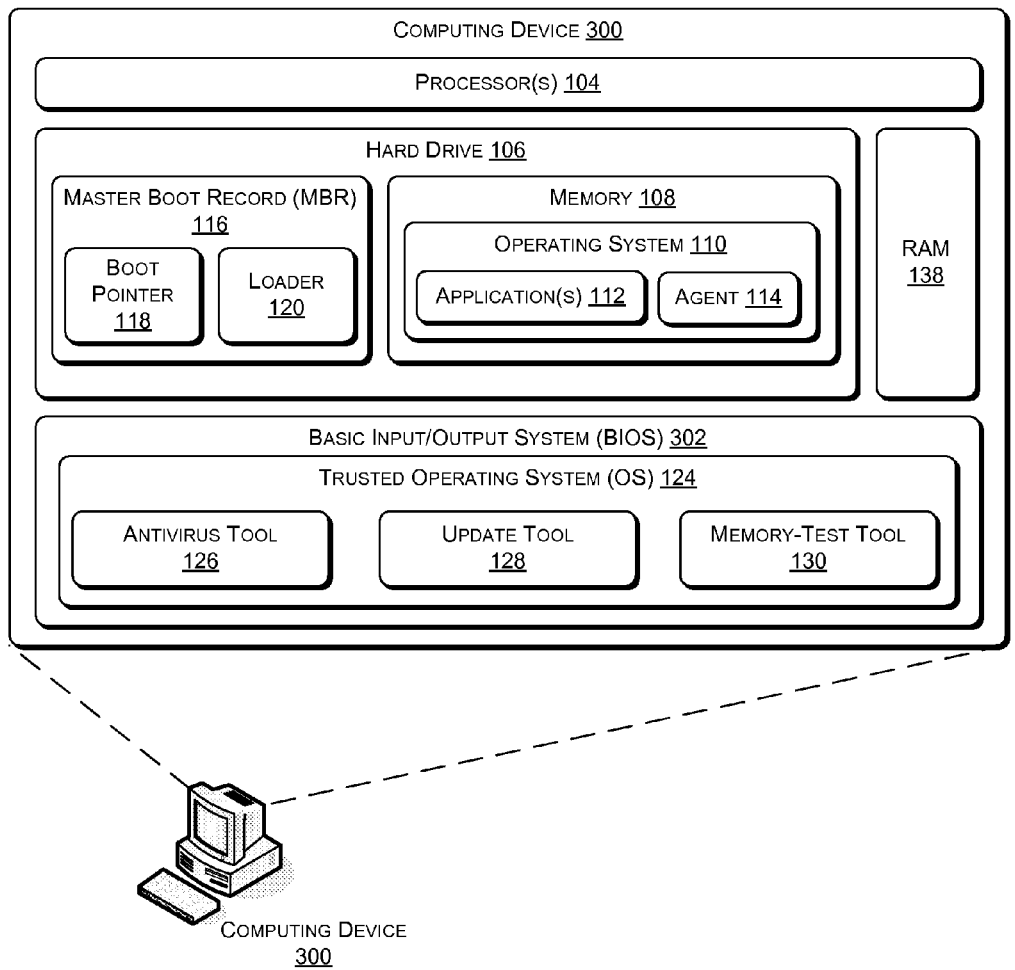
FIG. 3 depicts an illustrative computing device of FIG. 1 where the trusted environment comprises a basic input/output system (BIOS) of the computing device.
Figure 4:
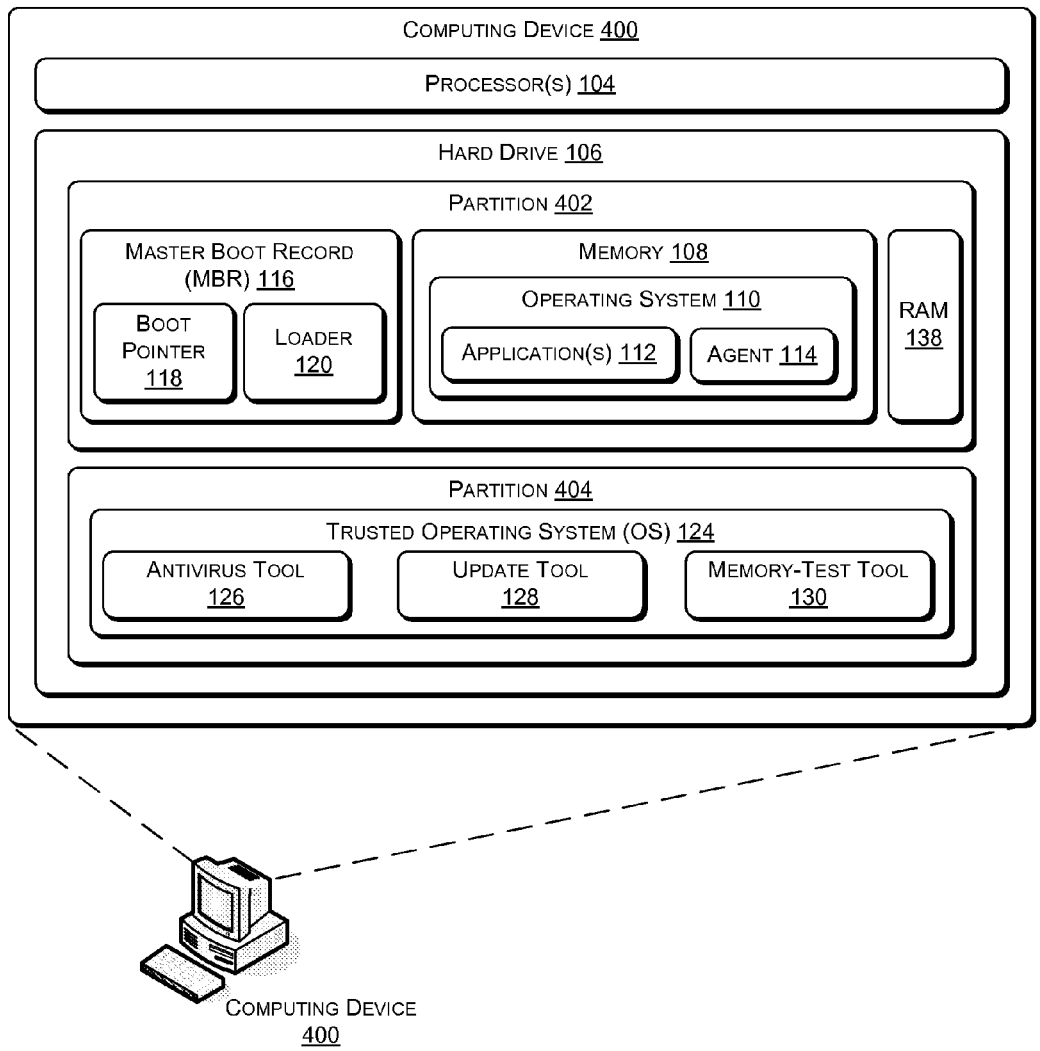
FIG. 4 depicts an illustrative computing device of FIG. 1 where the trusted environment comprises a partition of a hard drive of the computing device. This partition is separate from a partition of the hard drive on which a primary operating system of the computing device resides.

FIG. 3, meanwhile, illustrates yet another possible configuration that may employ the described techniques. Here, a computing device 300 is shown to include hard drive 106 as well as a basic input/output system (BIOS) 302. BIOS 302, meanwhile, stores trusted OS 124 and, hence, represents the trusted environment from FIG. 1. After computing device 300 enters a hibernated state, the device reboots from the BIOS and loads trusted OS 124 to perform an operation upon the device. Upon completion of the operation, computing device 300 may reboot back to hard drive 106, or boot pointer 118 may simply be altered such that the pointer again points to hard drive 106.

Next, FIG. 4 illustrates a computing device 400, which again may include many of the same components illustrated by and described with reference to FIG. 1. Here, however, hard drive 106 of computing device 400 includes two separate and discrete partitions. A first partition 402 stores operating system 110, while a second partition 404 comprises the trusted environment and, hence, stores trusted OS 124. With this configuration, agent 114 may reboot computing device 400 from partition 404 in response to the device entering a low-power state such as hibernation. Upon completion of a particular operation or operations, computing device 400 may reboot from partition 402 or boot pointer 118 may simply be altered to point to partition 402.

Illustrative Processes

Figure 5:
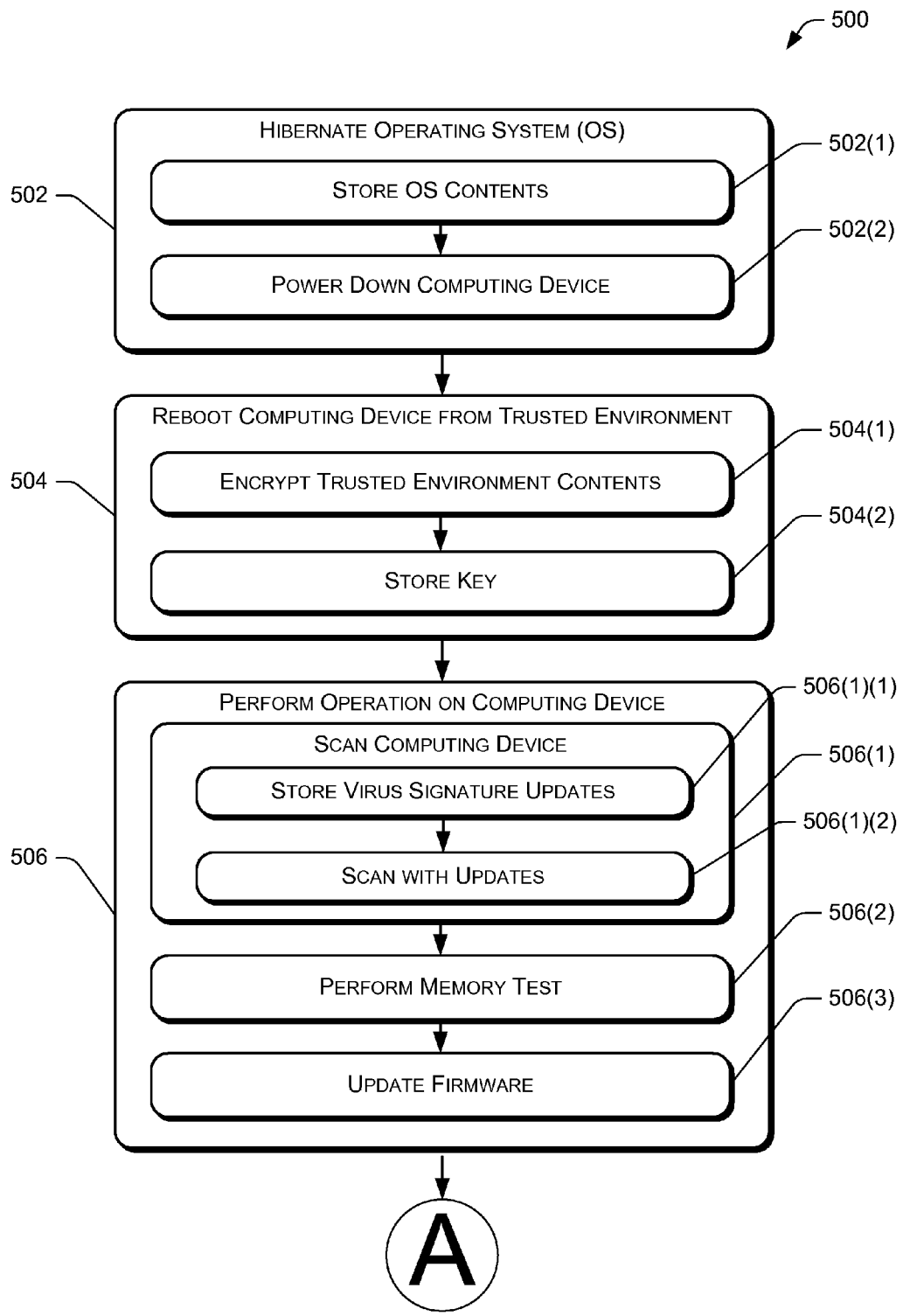
FIGS. 5-6 depict an illustrative process for rebooting a computing device from a trusted environment in response to the computing device entering a low-power state, such as a hibernated state.
Figure 6:
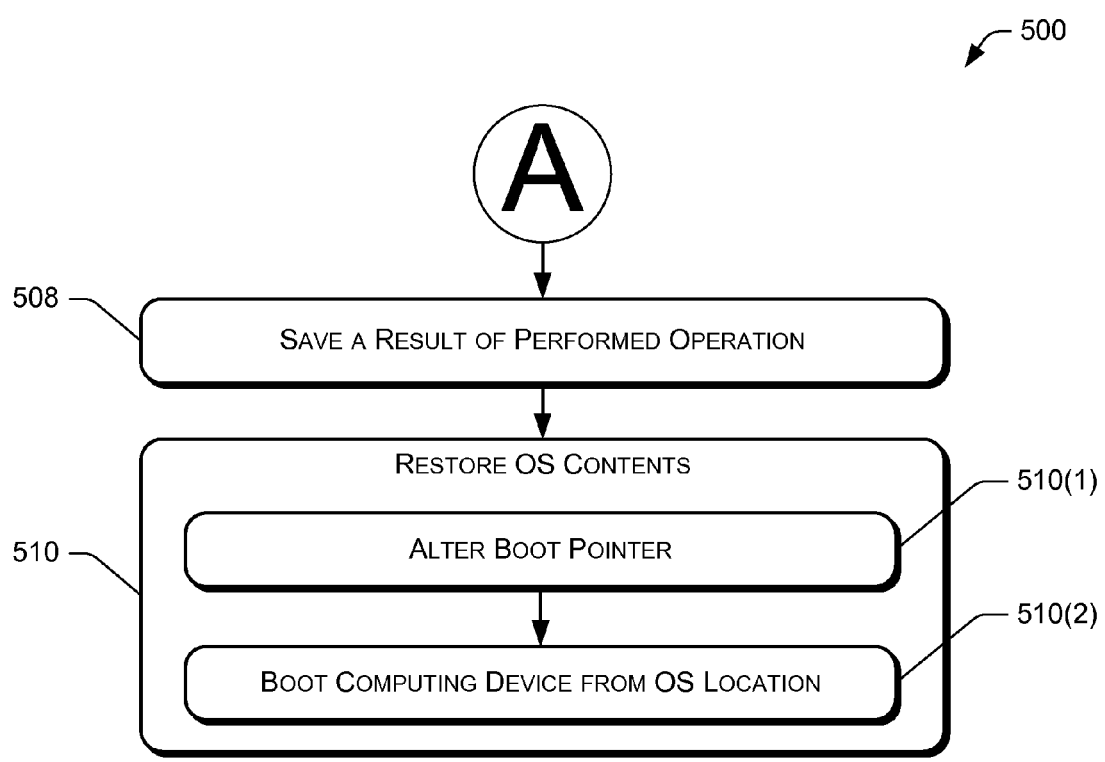

Having described illustrative configurations that may employ the claimed techniques, FIGS. 5-6 depict an illustrative process 500 for implementing these techniques. Process 500 is illustrated as a collection of blocks in a logical flow graph, which represents a sequence of operations that can be implemented in hardware, software, or a combination thereof. In the context of software, the operations represent computer instructions that, when executed by one or more processors, perform the recited operations. The order in which the operations are described is not intended to be construed as a limitation, and any number of the described operations can be combined in any order and/or in parallel to implement the process.

Process 500 includes operation 502, which represents hibernation of an operating system. Hibernation may occur due to user interaction, user inactivity, or otherwise. Operation 502 may include two sub-operations, 502(1) and 502(2). Sub-operation 502(1) represents storing contents of the operating system in, for example, non-volatile memory such as a hard drive. For instance, some or all of contents of the RAM 138 may be stored in memory 108 on hard drive 106. Because these contents are stored to the hard drive, the memory may be substantially free to scan without disrupting the stored contents. As discussed above and below, the contents (including contents of open applications and files) may be restored at a later time from the hard drive without modification. After storing these contents, sub-operation 502(1) represents powering down (e.g., powering off) some or all components of the computing device.

Operation 504, meanwhile, represents rebooting the computing device from a trusted environment. This rebooting, which may occur in response to the computing device entering the hibernated state, may occur according to a periodic schedule, randomly, as-needed, as-desired, or otherwise. For instance, this rebooting may occur responsive to each hibernation of the device, responsive to every other hibernation, responsive to a need to install new firmware on the device, daily, and/or a combination thereof. While a few illustrative examples have been given, multiple other policies determining a timing of the claimed techniques may be implemented.

The trusted environment from which the computing device reboots, meanwhile, may comprise a hard drive that is separate from the hard drive on which the hibernated operating system is stored. The trusted environment may also comprise a partition on a hard drive that is separate from the partition on which the hibernated operating system is stored. Conversely, the trusted environment may comprise a BIOS of the computing device, a network device such as a remote computer, or another environment that is inaccessible or unalterable from the location of the hibernated operating system.

Operation 504 may include a series of related sub-operations. Sub-operation 504(1) represents that contents of the trusted environment may be encrypted. This encryption acts as further protection to alteration of the trusted-environment contents from the hibernated operating system or from other environments outside of the trusted environment. For instance, if the trusted environment comprises a separate partition on a same hard drive upon which the operating system is stored, then encryption of the contents of the separate partition may protect these contents from alteration by viruses or the like located in the OS-partition. Next, sub-operation 504(2) represents storing the key with which the contents were encrypted in a safe location (e.g., a location that is inaccessible from the location of the operating system, such as a built-in smart card).

Next, operation 506 represents performing an operation on the computing device. Operation 506 may include one or more of sub-operations 506(1)-(3). Sub-operation 506(1) represents scanning the computing device to detect, for instance, viruses loaded onto the computing device. In some instances, this scanning, as well as any other computing-device operations performed in operation 506, occurs from a trusted operating system as discussed above.

Sub-operation 506(1) may itself include related sub-operations. For instance, sub-operation 506(1)(2) represents storing virus signature updates for use by the scanning tool such as antivirus tool 126. This sub-operation may store these updates in a location that is accessible from both the hibernated operating system as well as the trusted environment (e.g., accessible location 136). With use of these updates, sub-operation 506(1)(2) may scan the computing device.

Additionally or alternatively to the described antivirus scan, sub-operation 506(2) may perform a memory test, while sub-operation 506(1)(3) may update components such as firmware on the computing device.

FIG. 6 continues the illustration of process 500, and includes illustrations of operation 508. This operation represents saving a result of the performed operation in a location that is accessible by both the trusted environment and the hibernated operating system, such as accessible location 136. As described above, this result may include an indication of the result of an antivirus scan. This stored result may also comprise a result of a memory test, an indication of whether firmware of the computing device was successfully updated, or may comprise some other result.

Finally, operation 510 represents restoring contents of the hibernated operating system. This operation may include sub-operations 510(1) and 510(2). Sub-operation 510(1) represents that, upon completion of the performed operation, a boot pointer of the computing device may be altered to point back to the location of the hibernated operating system. For instance, if the hibernated operating system resides a on a first hard drive and the trusted environment comprises a second hard drive, then sub-operation 510(1) may alter the boot pointer to point to the first hard drive. Sub-operation 510(2), meanwhile, represents booting the computing device from the location of the operating system. In the example given immediately above, sub-operation 510(2) boots the computer from the first hard drive (storing the operating system) rather than the second hard drive (comprising the trusted environment). The reboot of operation 510(2) may occur in response to completion of the computing-device operation of operation 506 (e.g., the antivirus scan), in response to a user command (e.g., to wake up the device), or in response to some other event. When the computer boots, system state that had previously been stored in non-volatile memory such as memory 108 may be transferred back to RAM 138. As such, the user may continue working on any programs or applications that he or she was previously working on before the entering of the low-power state (and without having to restart these programs and applications).

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented at least in part on a computing device, the method comprising:
   booting the computing device from a primary operating system stored on a hard drive;
   hibernating without user interaction the primary operating system of the computing device after a predetermined length of user inactivity on the computing device;
   altering a boot pointer to point to a trusted operating system stored in a basic input/output system (BIOS) of the computing device;
   responsive to the hibernating and without user interaction, booting the computing device from the trusted operating system stored in the BIOS, the trusted operating system being unalterable from the hibernating primary operating system;
   scanning the computing device with an antivirus tool stored in the BIOS to determine whether a virus is stored on the computing device; and
   after completing the scanning of the computing device with the antivirus tool and responsive to determining that a virus is not stored on the computing device, altering a boot pointer to point to a location of the primary operating system on the hard drive.

2. A method as recited in claim 1, wherein hibernating the primary operating system comprises storing contents of the primary operating system to non-volatile storage of the computing device and powering down the computing device.

3. A method as recited in claim 1, wherein the trusted operating system includes the antivirus tool.

4. A method as recited in claim 1, wherein the trusted operating system further includes a update tool, further comprising updating software or firmware installed on computing device with the update tool.

5. A method as recited in claim 1, wherein the trusted operating system further includes a memory test tool, further comprising performing a memory test for memory of the computing device with the memory test tool.

6. A method as recited in claim 1, further comprising rebooting without user interaction the primary operating system of the computing device after the scanning of the computing device with the antivirus tool.

7. A method as recited in claim 1, further comprising, after the scanning of the computing device with the antivirus tool and responsive to determining that a virus is stored on the computing device, removing the stored virus with the antivirus tool.

8. A method comprising:
   storing contents of an operating system in non-volatile storage of a computing device after a predetermined length of user inactivity on the computing device, the non-volatile storage including a master boot record comprising a boot pointer;
   altering the boot pointer of the computing device to point to a location of a trusted environment;
   after the storing of the contents, rebooting the computing device by operation of a processor and without user interaction from the trusted environment using the boot pointer, the trusted environment unalterable from the operating system, the trusted environment including contents encrypted with a key;
   performing one or more operations on the computing device from the trusted environment that includes detecting a presence of a virus on the computing device; and
   after performing the one or more operations in the trusted environment that includes the detecting the presence of the virus, loading the operating system by restoring the contents of the operating system and using the operating system to provide an indication of the presence of the virus on the computing device based on a detection of the virus by the trusted environment.

9. A method as recited in claim 8, wherein restoring the contents of the operating system comprises:
   altering the boot pointer of the computing device to point to a location of the operating system; and
   receiving a user request to power on the computing device.

10. A method as recited in claim 8, wherein loading the operating system includes loading the operating system.

11. A method as recited in claim 8, wherein rebooting the computing device by operation of a processor and without user interaction from the trusted environment using the boot pointer comprises rebooting the computing device from a network device that is used to store the trusted environment, the network device accessible by the computing device.

12. A method as recited in claim 8, wherein performing the one or more operations further includes performing a memory test on the computing device.

13. A method as recited in claim 8, wherein performing the one or more operations further includes updating a firmware of the computing device.

14. A method as recited in claim 8, wherein detecting the presence of the virus includes:
   storing virus signature updates in a location that is accessible by both the trusted environment and a location of the operating system; and
   scanning the computing device with use of the virus signature updates.

15. One or more computer-readable storage memory storing computing-executable instructions that, when executed by one or more processors, perform acts comprising:
   receiving an indication that an operating system of a computing device has entered a hibernated state, the operating system stored on a drive of the computing device;
   altering a boot pointer to point to a basic input/output system (BIOS) of the computing device;
   responsive to receiving the indication and without user interaction, booting the computing device from encrypted contents that are stored in the BIOS of the computing device, the encrypted contents providing an environment that is unalterable by the operating system; and
   scanning, testing, or updating contents of the computing device from the environment that is unalterable by the operating system.

16. One or more computer-readable storage memory as recited in claim 15, further storing computer-executable instructions that, when executed by the one or more processors, perform an act comprising altering a boot pointer of the computing device to point to the operating system stored in the drive of the computing device after the scanning, testing, or updating of the contents of the computing device.

17. One or more computer-readable storage memory as recited in claim 15, wherein the entering of the hibernated state, the testing, scanning, and updating, and the altering of the boot pointer occur without user interaction on the computing device.

18. One or more computer-readable storage memory as recited in claim 15, wherein the environment that is unalterable by the operating system is provide by a trusted operating system that is loaded using the encrypted content stored in the BIOS of the computing device.

19. One or more computer-readable storage memory as recited in claim 15, wherein the encrypted content are encrypted with a key; that is inaccessible from the drive of the computing device.

20. One or more computer-readable storage memory as recited in claim 15, wherein entering the hibernated state comprisessaving contents of open applications to the drive of the computing device without closing the open applications.

* * * * *